United States Patent
VanDuyn (10) Patent No.: US 12,255,796 B2
(45) Date of Patent: Mar. 18, 2025

(54) METHODS AND SYSTEMS FOR SELECTING A REDUNDANT NETWORK SOURCE AT A GATEWAY

(71) Applicant: DISH Network L.L.C., Englewood, CO (US)

(72) Inventor: Luke VanDuyn, Conifer, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/883,875

(22) Filed: Aug. 9, 2022

(65) Prior Publication Data

US 2024/0056372 A1     Feb. 15, 2024

(51) Int. Cl.
| | |
|---|---|
| *H04L 43/0894* | (2022.01) |
| *H04L 41/5019* | (2022.01) |
| *H04L 12/28* | (2006.01) |
| *H04L 41/12* | (2022.01) |
| *H04L 41/5025* | (2022.01) |
| *H04L 43/16* | (2022.01) |
| *H04L 45/24* | (2022.01) |
| *H04W 24/02* | (2009.01) |

(52) U.S. Cl.
CPC ...... *H04L 43/0894* (2013.01); *H04L 41/5019* (2013.01)

(58) Field of Classification Search
None
See application file for complete search history.

(56) References Cited

U.S. PATENT DOCUMENTS

| | | | |
|---|---|---|---|
| 2015/0172217 A1* | 6/2015 | Cook | H04L 47/12 370/230 |
| 2015/0245409 A1* | 8/2015 | Medapalli | H04W 76/20 370/329 |
| 2017/0134261 A1* | 5/2017 | Seo | H04L 45/24 |
| 2017/0187639 A1* | 6/2017 | Hodroj | H04L 47/41 |
| 2018/0351844 A1* | 12/2018 | Viox | H04W 24/02 |
| 2019/0053114 A1* | 2/2019 | Karimli | H04W 36/1446 |
| 2019/0166643 A1* | 5/2019 | Petria | H04W 76/16 |
| 2021/0235349 A1* | 7/2021 | Chow | H04L 43/0852 |
| 2022/0311481 A1* | 9/2022 | Jiao | H04W 48/02 |

* cited by examiner

*Primary Examiner* — Kamal M Hossain
(74) *Attorney, Agent, or Firm* — Perkins Coie LLP (57) ABSTRACT

The present disclosure is directed to methods and systems for selecting a redundant network source at a gateway. The system can include a gateway with the ability to support combining multiple network sources to increase the network speed or bandwidth from the gateway or selecting a redundant network source to increase the network speed or bandwidth for a particular application. The system can increase the network speed by adding a second network source for a particular application (e.g., video steaming, video call, etc.) or an application requiring lower latency than the current network source provides. The additional network source can send all the data packet traffic of the application or the application's traffic is split between the additional network source and the current network source of the gateway.

17 Claims, 6 Drawing Sheets

METHODS AND SYSTEMS FOR SELECTING A REDUNDANT NETWORK SOURCE AT A GATEWAY

BACKGROUND

Many users have a single internet source coming into their homes. If the internet connection is slow or has bandwidth limitations, a user can experience buffering or internet dropouts when performing a task, such as video streaming. Internet connections with high lag times and bandwidth constraints can create an unpleasant user experience. However, many users do not have the technical expertise to identify how to fix a slow internet connection.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for selecting a redundant network source at a gateway. The system can include a gateway (e.g., a router, such as a 5G router, a multi-SIM router, etc.) with the ability to support combining multiple network sources to increase the network speed (e.g., data transfer rate) or bandwidth (e.g., volume of data) from the gateway. The system can select a redundant network source to increase the network speed/bandwidth for a particular application. Examples of network sources can include cellular, digital subscriber line (DSL), satellite, cable, broadband, or fiber. Combining multiple network sources can increase the speed of the internet for a user device(s) by supplementing the main network source. For example, the gateway is configured to utilize a hotspot device (cellular network mobile data connection) to add a second internet connection by integrating the main connection with the hotspot device. In some cases, the gateway has a chip(s) (e.g., SIM card(s) on the gateway), to utilize as the redundant internet connection to increase the internet speed. The system can increase the network speed by adding the second network source for a particular application (e.g., video steaming, video call, etc.) or an application requiring lower latency than the current network source provides. The additional network source can send all the data packet traffic of the application or the application's traffic is split between the additional network source and the original network source of the gateway.

In some implementations, the system measures the network speed at a gateway provided by the main network source (e.g., satellite internet or cable internet) and determines whether the speed meets a quality of service (QOS) threshold. When the network speed is below the QOS threshold, the redundant network source system can select an alternative network source or combine the main network source with a secondary network source to increase the network speed at the gateway. In some implementations, a user can trigger the gateway to select the secondary network source by placing a device connected to the secondary network source (e.g., cellular network) within a proximity of the gateway (receiving network connectivity from a first network source). The secondary network source can provide connectivity for a particular application, such as a video streaming application.

In some implementations, the redundant network source system combines the first and second network sources at the gateway based on an authentication trigger of an NFC source. For example, the redundant network source system uses the NFC as an authentication trigger to authorize the setup process for the virtual connection of the second source at the gateway. The redundant network source system can combine the bandwidth from the multiple sources and perform load balancing of the data packets between the multiple network sources. The gateway can combine the bandwidth from the sources and split the data packets among the network sources to provide the user with an increased network speed.

Methods and systems disclosed herein can provide technical advantages over conventional systems. The disclosed redundant network source system provides: 1) the ability to support an increase in network speed/bandwidth for a particular application; 2) the ability for the user to initiate the network speed/bandwidth increase via an application on a user interface; and 3) the ability for a task to trigger combining the multiple network sources; and 4) the ability for a gateway to automatically identify a second network source to use for the combination based on the task or application. It is understood that network speed as described herein can refer to the network speed (e.g., data transfer rate) or network bandwidth (e.g., volume of data) provided from a gateway.

Figure 1:
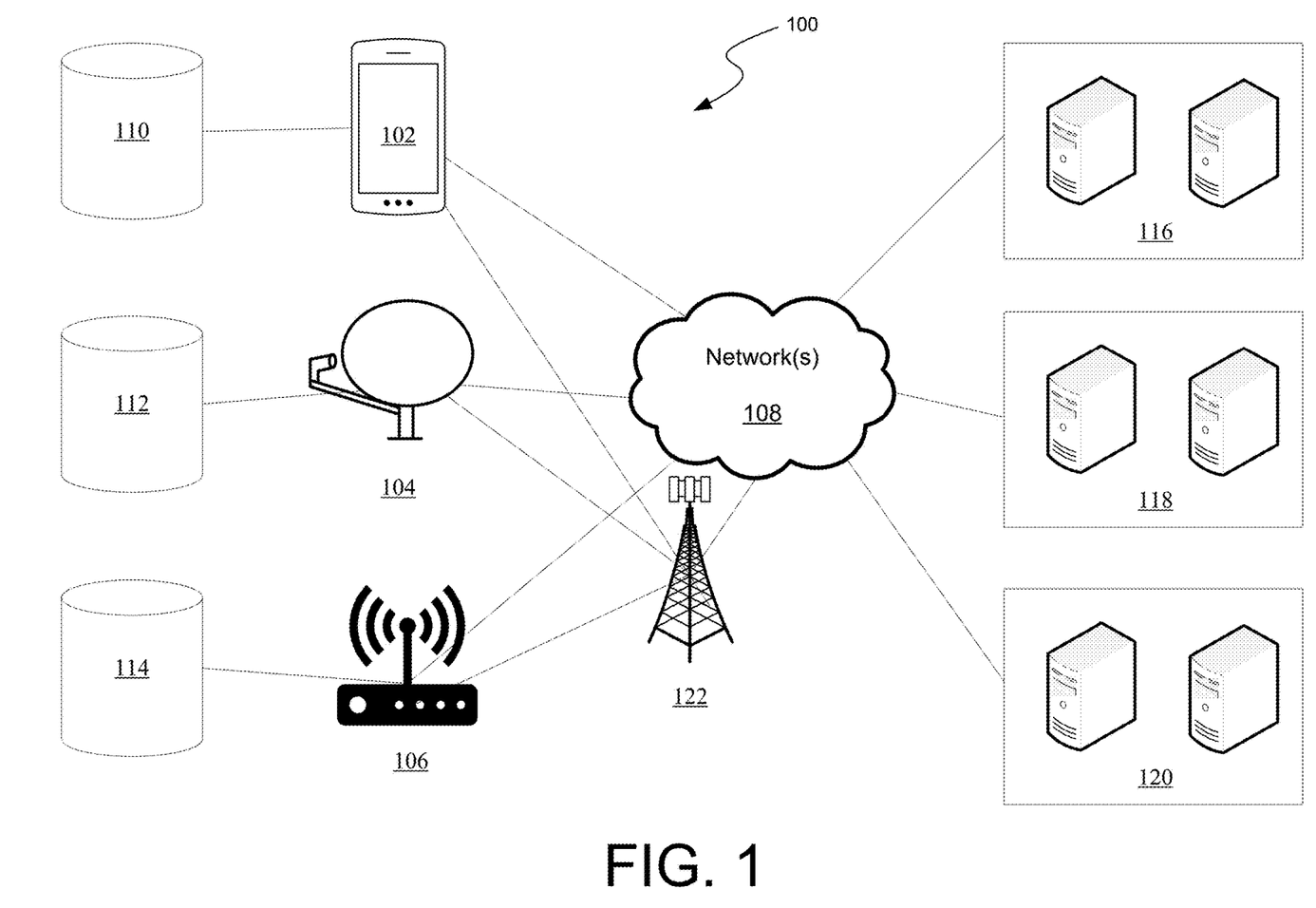
FIG. 1 illustrates an example of a distributed system for selecting a redundant network source at a gateway.

FIG. 1 illustrates an example of a distributed system for selecting a redundant network source at a gateway. Example system 100 presented is a combination of interdependent components that interact to form an integrated whole for selecting a redundant network source at a gateway. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to support increasing network speed by combining network sources at a gateway or selecting a redundant network source at the gateway. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, internet providers, or satellite networks. Other possible client devices include but are not limited to tablets, personal computers, televisions, etc. In aspects, a client device, such as client devices 102, 104, and 106, may have access to a network(s) from a gateway. In other aspects, client devices 102, 104, and 106, may be equipped to receive data from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that measures the network speed, identifies additional network sources, instructs a user on how to increase network speed, selects an alternative network source, and/or combines multiple network sources to increase network speed from a gateway. Client devices 102, 104, and 106 may access content data through the networks. The content data may be stored locally on the client device or run remotely via network(s) 108. For example, a client device may receive a signal from broadcast tower 122 containing content data. The signal may indicate user requested media content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing content to a user from a gateway at an increased network speed. Such databases may contain certain content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
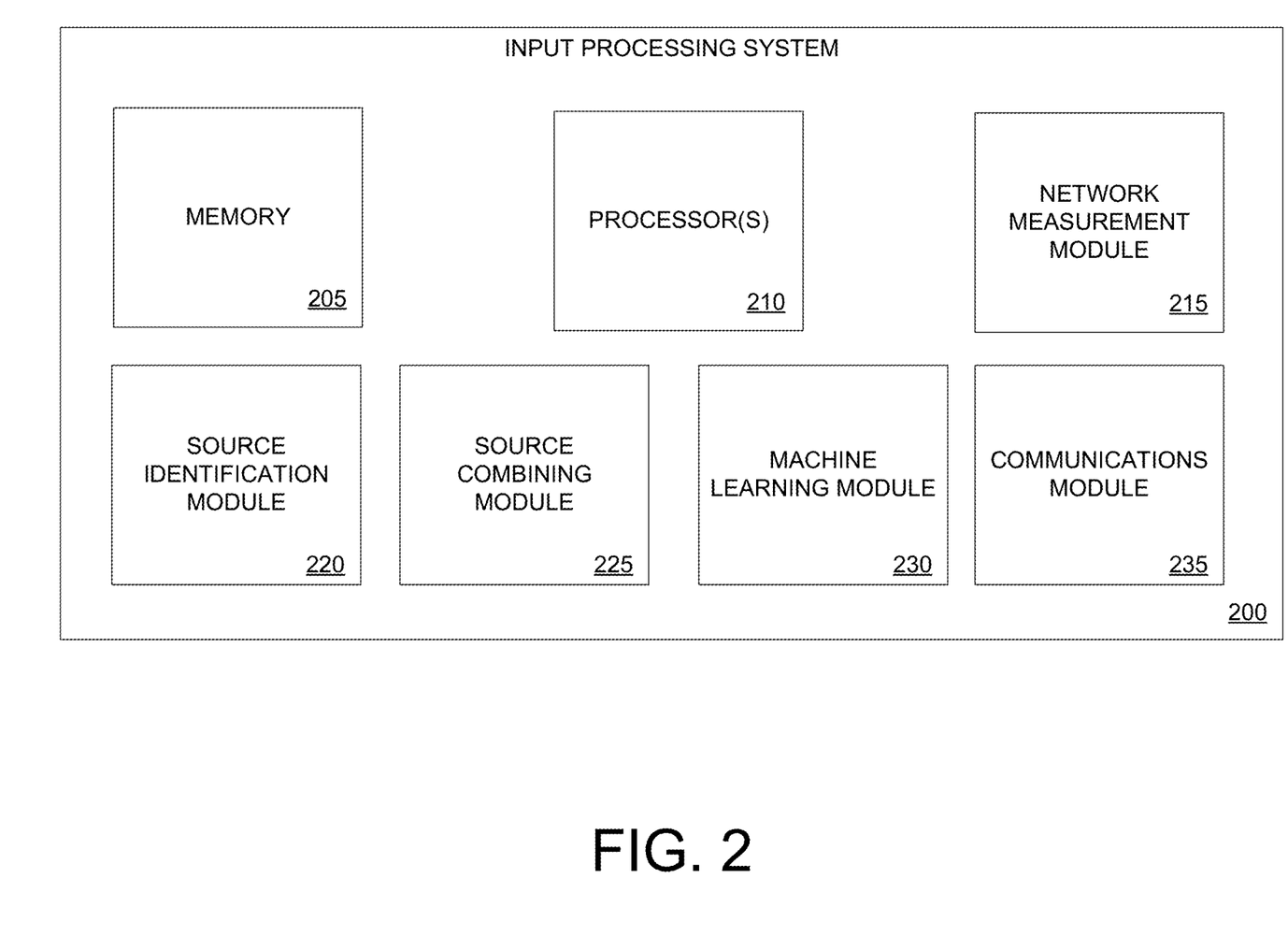
FIG. 2 illustrates an example input processing system for implementing systems and methods for selecting a redundant network source at a gateway.

FIG. 2 illustrates an example input processing system for implementing systems and methods for selecting a redundant network source at a gateway. The input processing system 200 (e.g., one or more data processors) is capable of executing algorithms, software routines, and/or instructions based on processing data provided by a variety of sources related to measuring the network speed, identifying additional network sources, instructing a user on how to increase network speed, selecting a redundant network source at a gateway, and combining multiple network sources to increase network speed from a gateway. The input processing system can be a general-purpose computer or a dedicated, special-purpose computer. According to the embodiments shown in FIG. 2, the disclosed system can include memory 205, one or more processors 210, network measurement module 215, source identification module 220, source combining module 225, machine learning module 230, and communications module 235. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of network measurement module 215, source identification module 220, source combining module 225, machine learning module 230, and communications module 235. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the network measurements, network source combining information, or network/speed information.

Network measurement module 215 may be configured to measure the network speed/bandwidth at a gateway and determine how the measurements compare to a QOS threshold. The network measurement module 215 can identify if a network source (e.g., satellite internet) has bandwidth limitations and is causing a poor user experience (e.g., buffering or delay during video streaming) for a user. A user can predetermine the network speed (e.g., 100 Mbps) that the network measurement module 215 should compare the measured network speed. In some cases, the QOS threshold is based on the network speed/bandwidth in the network subscription package of the user. The network measurement module 215 can measure the network speed at a gateway when the user accesses a particular application or performs a task (e.g., video call, video streaming, etc.). When the measurements are below a QOS threshold, the network measurement module 215 can communicate with the source identification module 220 to identify an additional source(s) to boost the network speed from the gateway by supplementing the main network source.

Source identification module 220 may be configured to identify an additional network source(s) to increase the network speed for an application executing on a user device. In some implementations, the additional network source(s) is provides network connectivity for a particular application (e.g., video call application, such as Zoom™). Examples of network sources can include cellular network mobile data, hotspots, digital subscriber line (DSL), satellite, cable, broadband, or fiber. For example, the source identification module 220 can identify that the gateway has one or more chips (e.g., SIM cards on the ODU) on that gateway that can be used to increase the network speed via the cellular network mobile data. In some implementations, the source identification module 220 identifies the additional network source(s) based on the user placing a hotspot device, such as a smart phone, within a proximity of the gateway. The gateway can integrate the hotspot network connection of the hotspot device with the current network connection via an NFC authentication trigger to increase the network speed from the gateway. For example, the source identification module 220 uses the NFC as an authentication trigger to authorize the setup process for the virtual connection of the second source at the gateway. In some implementations, the source identification module 220 identifies the additional network source(s) based on the application or task of the user. For example, when the user accesses an application for a video call, the gateway selects a hotspot capability of the user's mobile device to combine with the main network from the gateway to increase the network speed.

Source combining module 225 may be configured to combine multiple network sources at the gateway to increase the network speed from the gateway. The source combining module 225 uses the NFC as an authentication trigger to authorize the setup process for the virtual connection of the second source and first source at the gateway. The source combining module 225 can combine the bandwidth from each network source and performing load balancing of the data packets. For example, the source combining module 225 can distribute the data packets among the bandwidth of the network sources so that the overall network from the gateway increases. The source combining module 225 can tether the network sources together with bandwidth stacking techniques.

Machine learning module 230 may be configured to analyze gateway settings to identify an alternative/secondary network source and provide connectivity for a particular application via the alternative/secondary network source. The machine learning module 230 may be configured to select an alternative/secondary network source and provide connectivity for a particular application via the alternative secondary network source based on at least one machine-learning algorithm trained on at least one dataset reflecting a user selecting an alternative/secondary network source to provide connectivity for a particular application. The at least one machine-learning algorithms (and models) may be stored locally at databases and/or externally at databases (e.g., cloud databases and/or cloud servers). Client devices may be equipped to access these machine learning algorithms and intelligently identify user preferences, such as the customizable features, and determine which network source to utilize for an application based on at least one machine-learning model that is trained on a user's historical redundant network source history. For example, if a user frequently requests a speed/bandwidth increase for an application/task (e.g., video calls, playing video games, streaming sporting events, etc.), the user's redundant network source history may be collected to train a machine-learning model to automatically select an alternative/secondary network source and provide connectivity for a particular application via the secondary network source when the user accesses the particular application on a user device.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process a user's redundant network source history and other data stores of user preferences (e.g., surveys, user profile settings, etc.) to select an alternative/secondary network source and provide connectivity for a particular application via the alternative/secondary network source. Based on an aggregation of data from a user's redundant network source history, user profiles, gateway settings, network settings, network capability, and other user data stores, at least one ML model may be trained and subsequently deployed to automatically determine when to identify an alternative/secondary network source and provide connectivity for a particular application via the alternative/secondary network source. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with multimedia information and channel guides. In such examples, the ML model may be locally cached by the client device.

Communications module 235 is associated with sending/receiving information (e.g., network measurement module 215, source identification module 220, source combining module 225, and machine learning module 230) with a remote server or with one or more client devices, streaming devices, routers, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends measurement information identified by the network measurement module 215, information identified by the source identification module 220, and information identified by the source combining module 225. Furthermore, communications module 235 may be configured to communicate content data to a client device and/or OTA box, router, smart OTA antenna, and/or smart TV, etc.

Figure 3:
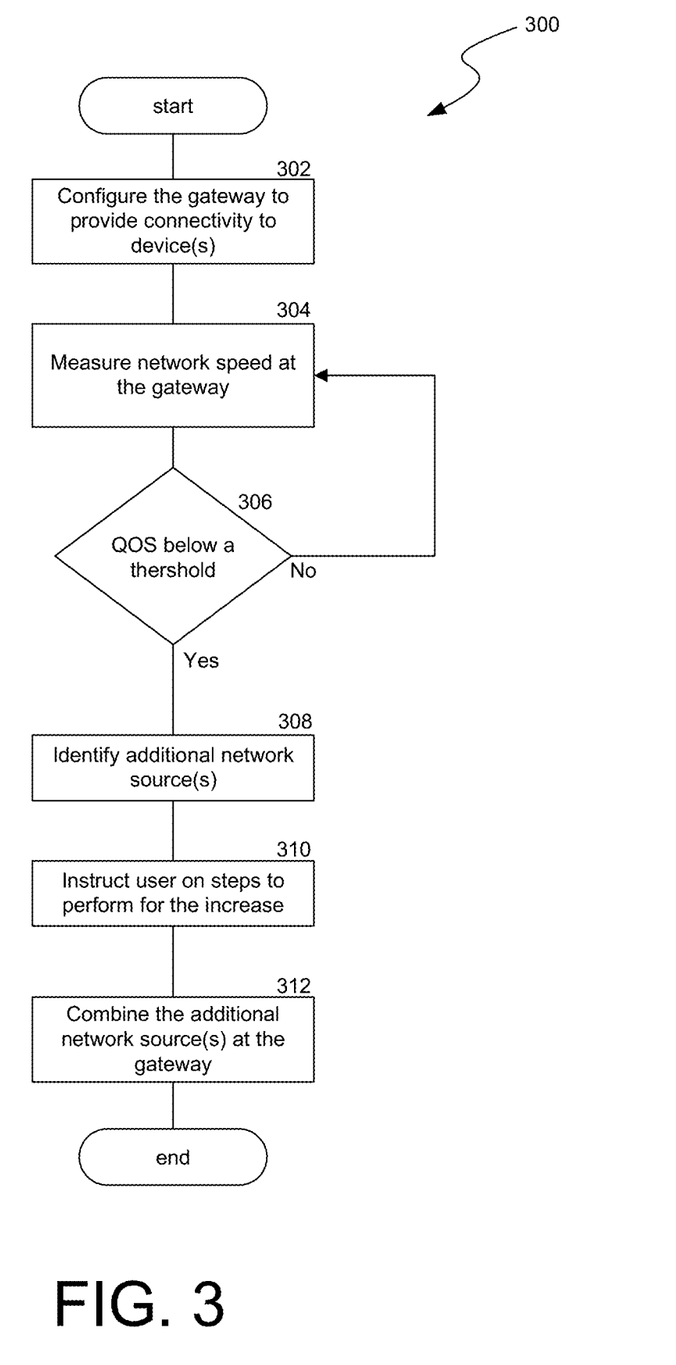
FIG. 3 is a flow diagram illustrating a process used in some implementations for combining network sources at a gateway.

FIG. 3 is a flow diagram illustrating a process 300 used in some implementations for combining network sources at a gateway. In some implementations, process 300 is triggered by a user activating a subscription for increasing network speed by combining network sources at a gateway (e.g., router), powering on a device, a device connecting to the gateway, powering on the gateway, the gateway connecting to a network source (e.g., ISP, cable network, satellite network, etc.), the user accessing an application, the user performing a task, or the user downloading an application on a device for adjusting network speed. In various implementations, process 300 is performed locally on the user device or performed by cloud-based device(s) that can provide/support combining network sources at a gateway to increase the network speed/bandwidth.

At block 302, process 300 connects a gateway to a network source that provides network connectivity to the gateway. Process 300 can determine the number of devices to receive network connectivity from the gateway. The gateway can provide the devices with a network speed/bandwidth that is supplied by the network source. A user can select gateway settings (e.g., a QOS threshold for network speed, such as 100 Mbps) on the gateway device, such as on a user interface screen or buttons on the gateway device, or the user can input settings in an application on a user device, such as a smart phone or tablet. When registering or activating the gateway, the user can provide access information (e.g., passwords, usernames, biometrics, etc.) to applications, user preferences, or security settings.

At block 304, process 300 measures the network speed/bandwidth provided by a network source at the gateway. Process 300 can measure the network speed/bandwidth at the gateway continuously, periodically, when the user accesses an application (e.g., media streaming application), or when the user performs a task (e.g., video calling, video streaming, etc.). For example, when a device executes an application, process 300 measures the internet speed at the gateway to verify the device has sufficient internet speed to operate the application.

At block 306, process 300 determines whether the measured network speed/bandwidth is below a QOS threshold. For example, process 300 can identify if a network source has bandwidth limitations which are causing buffering or delays while the user utilizes an application (e.g., video streaming). A user can predetermine the network speed (e.g., 100 Mbps) or network bandwidth (e.g., 25 Mbps) that is the QOS threshold. In some cases, the QOS threshold is based on the network speed/bandwidth of the network subscription package purchased by the user. When the measured network speed/bandwidth is not below the QOS threshold, process 300 can continue to measure the network speed/bandwidth provided by a network source at the gateway.

When the measured network speed/bandwidth is below the QOS threshold, at block 308, process 300 identifies an additional network source(s) to combine to the current network source to increase the network speed/bandwidth from the gateway. In some implementations. the additional network source is selected to communicate all or some of data traffic for an application executing on a user device. The additional network source(s) is a different network source than the current network source. For example, if the current network source is a satellite network providing satellite internet, the addition source(s) can include a cellular network mobile data, a hotspot provider, a DSL network, cable network, broadband network, or fiber network. In some implementations, the gateway has a cellular network chip(s) (e.g., SIM card(s) on the ODU) that it utilizes for the additional network source(s). Process 300 can select the additional network source(s) based on the metadata associated with the user device connected to the gateway or the metadata of the application the user is accessing. For example, if the user performing a video call on a device via a satellite internet source, process 300 selects a smart phone device with hotspot connectivity via a cellular network as the additional network to combine with the satellite internet source. Process 300 can select the secondary network sources based on the duration the user spends accessing the application. For example, if the user is accessing a video game via a satellite internet source, process 300 selects the cellular network chip(s) on the gateway to supplement the satellite internet source, as the duration of video gaming for the user is longer than the duration of a video call. Metadata can include usage analytics from the user devices which can show the duration of the network connection along with the data usage. Metadata can also include the device type and the content type.

Process 300 can identify the additional source(s) when the user accesses an application or after the application has been executing a device for a time threshold. For example, process 300 waits a time threshold (e.g., 3 seconds, or any amount of time) to determine whether the user is going to continue to access the application or whether the user accessed and exited the application. If the user accesses the application but exits before the time threshold (e.g., after a few seconds), process 300 will not identify an additional network source as the user is probably scrolling through applications on their device. In some cases, at block 310, process 300 instructs the user on steps for the user to perform to increase the network speed. For example, process 300 notifies the user in a user interface to move a hotspot device within a proximity of the gateway. Process 300 can notify the user on buttons to press on the gateway or procedures to follow for an increase in network speed. Additional details are provided in FIG. 4.

At block 312, process 300 combines the additional network source(s) to the main network source at the gateway to the increase the network speed/bandwidth from the gateway. The process 300 can combine the multiple network sources by combining the bandwidth from each network source. Process 300 can perform load balancing of the data packets from each source. For example, process 300 distributes the data packets among the bandwidth of the network sources so that the overall network bandwidth from the gateway increases. In some implementations, process 300 measures the network speed/bandwidth provided by the combined network sources and if the measurement is below the QOS threshold, process 300 selects another secondary network source to increase the network speed. For example, if the hotspot device supplementing the satellite internet fails to provide an increase in internet speed at the gateway, process 300 selects SIM cards on the gateway to provide the supplemental internet connection. To avoid sending duplicative or inefficient packets of data for one application or type of communication over both network sources, the gateway can utilize Multi-Path TCP (e.g., RFC 6824) to send the data packet traffic for a particular application (e.g., video call application) to the additional network source to prevent duplicative data packets. Prior to selecting the alternative network source, the gateway can perform a measurement of the alternative network source to verify that the alternative source can provide a network speed above a QOS threshold for the application (e.g., video call application). The gateway can perform a latency test or speed test to verify the QOS measurement prior to sending the data packets of the application to the alternative network source (e.g., cellular network, such as a hotspot).

Figure 4:
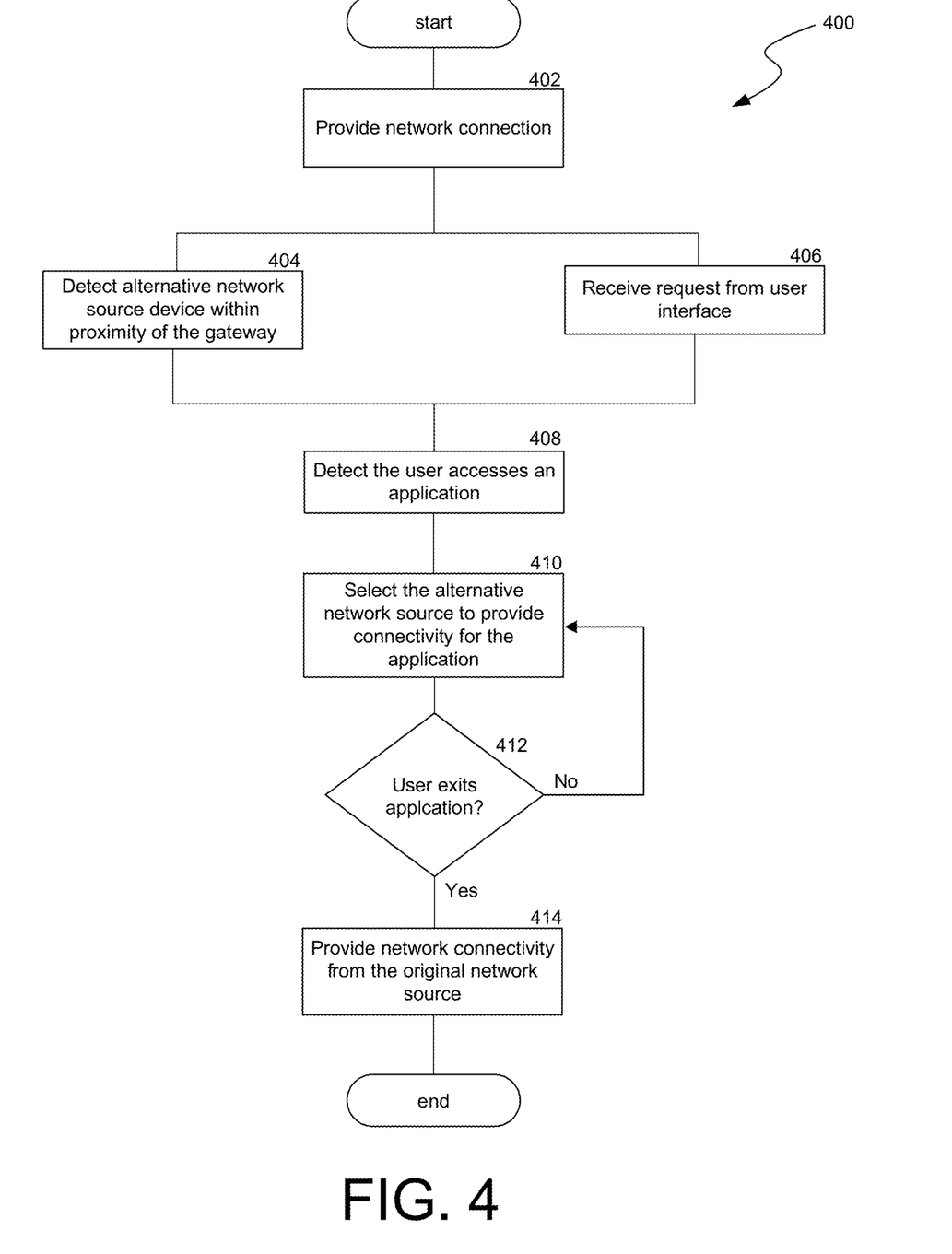
FIG. 4 is a flow diagram illustrating a process used in some implementations for selecting a redundant network source at a gateway based on an application.

FIG. 4 is a flow diagram illustrating a process 400 used in some implementations for selecting a redundant network source at a gateway based on an application. In some implementations, process 400 is triggered by a user activating a subscription for selecting a redundant network source at a gateway (e.g., router) for a particular application, powering on a device, a device connecting to the gateway, powering on the gateway, the gateway connecting to a network source (e.g., ISP, cable network, satellite network, etc.), the user accessing an application, the user performing a task, or the user downloading an application on a device for alternative network sources. In various implementations, process 300 is performed locally on the user device or performed by cloud-based device(s) that can provide/support selecting a redundant network source at a gateway for an application.

At block 402, process 400 provides a network connection to user devices from a gateway. At block 404, process 400 detects, via a connection such as an NFC connection, a device connected to an alternative network source (e.g., device with cellular network mobile data, such as a hotspot) is within a proximity of the gateway. For example, process 400 detects the user placed their device with hotspot capability on the gateway or near (within any distance, such as inches or feet) the gateway. The gateway can connect to the alternative network source and the original network source.

At block 406, process 400 receives a request from a user interface for a network speed/bandwidth increase for an application/task (e.g., video call, video gaming, or any network activity) executing on a user device. After receiving the request, process 400 can send a notification to the user in the user interface to connect an alternative network source, such as a hotspot device (e.g., a smart phone with connectivity to a different network source than the current network source of the gateway) to the gateway via an NFC. Process 400 can notify the user to move the hotspot device within a proximity of the gateway, notify the user to press buttons on the gateway or procedures to follow to connect the alternative network source to the gateway.

At block 408, process 400 detects the user accesses an application executing on a user device. The user can click on the application in a user interface or provide authentication credentials to access the application. The user accessing the application can trigger process 400 to select the alternative network source to provide connectivity for the application while the user is active (e.g., scrolling, clicking, viewing video content, playing audio content, etc.) on the application. For example, process 400 utilizes the alternative source for a video call but switches connectivity back to the original network source once the video call is completed. The gateway can identify the application (e.g., video call application, such as Zoom™) by packet inspection. For example, the gateway monitors a predetermined number of packets of a data packet stream (e.g., TCP stream) and identifies the traffic of the application in the data stream. Once the application's traffic (e.g., video call) is identified on a user device, the gateway can send all the application's traffic over the alternative network sources rather than the original network source of the gateway. Prior to selecting the alternative network source, the gateway can perform a measurement of the alternative network source to verify that the alternative source can provide a network speed above a QOS threshold for the application (e.g., video call application). The gateway can perform a latency test or speed test to verify the QOS measurement prior to sending the data packets of the application to the alternative network source (e.g., cellular network, such as a hotspot). In some implementations, the application's traffic is split between the additional network source and the original network source of the gateway.

At block 410, process 400 selects the alternative network source to provide connectivity for the device executing the application. In some implementations, the gateway selects the alternative network source to provide connectivity for the application for a predetermined period and selects the original network source when the period is completed. For example, some cellular network subscription packages come with a limited amount of mobile data for hotspot capability. Based on the user's subscription package, process 400 monitors the hotspot usage and stops the providing connectivity via the cellular hotspot data prior to exhausting the user's hotspot allowance. In some implementations, process 400 measures the network speed/bandwidth provided by the alternative network source and if the measurement is below the QOS threshold, process 400 selects another secondary network source to provide connectivity for the user device executing the application. For example, if the hotspot device supplementing the satellite internet fails to provide an increase in internet speed at the gateway, process 400 selects SIM cards on the gateway to provide the supplemental internet connection.

At block 412, process 400 determines whether the user exits the application. The user can close the application on the user interface or power off the device to indicate the user is not accessing the application. While the user accesses the application, process 400 can continue to provide connectivity via the alternative network source to the user device executing the application. When the user exits the application, at block 414, process 400 provides a network connection to user devices from the gateway via the original network source.

Figure 5:
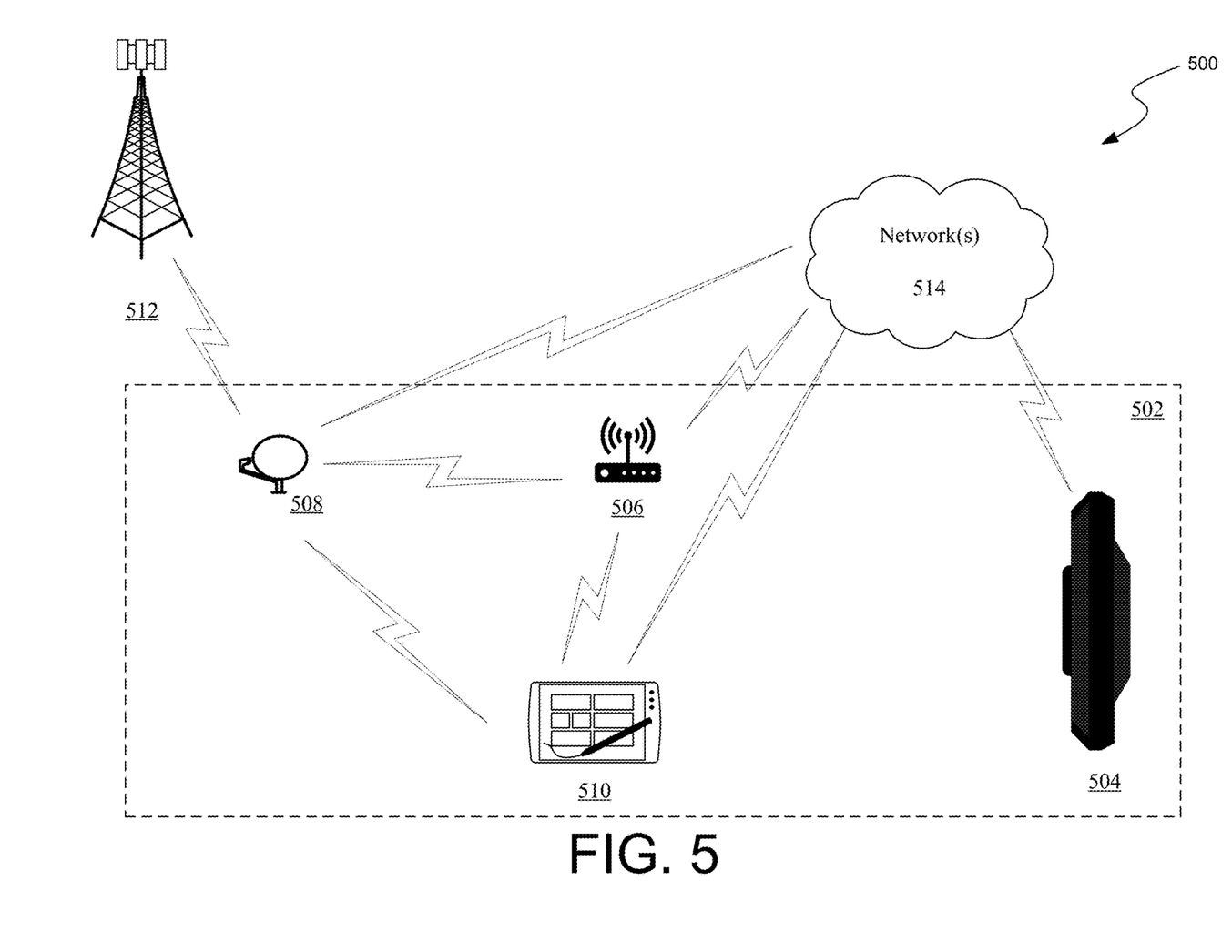
FIG. 5 illustrates an example environment of operation of the disclosed technology.

FIG. 5 illustrates an example environment of operation of the disclosed technology. In the example environment 500 illustrated in FIG. 5, area 502 may represent a house, a commercial building, an apartment, a condo, or any other type of suitable dwelling. Inside area 502 is at least one television 504, an OTA box 506 (e.g., router or broadcast module box) an OTA antenna 508, and a mobile device 510. Each of these devices may be configured to communicate with network(s) 514. OTA box 506 may be configured as a central gateway communicable with various multimedia content providers, networks, devices, and user storage sources, among other servers and databases housing content available for retrieval and display on user devices. Network(s) 514 may be a WiFi network and/or a cellular network. The OTA antenna 508 may also be configured to receive local broadcast signals from local broadcast tower 512 or satellite broadcast tower.

Figure 6:
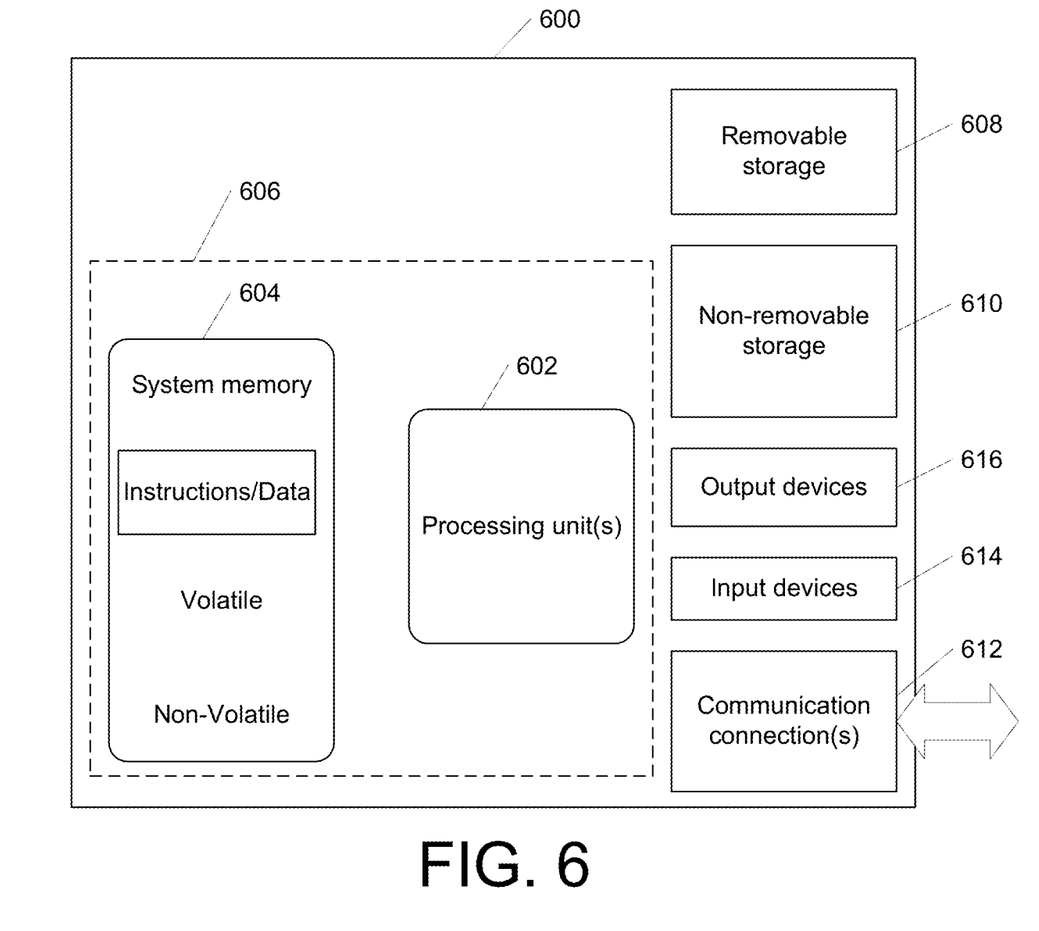
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method for selecting a secondary network source at a gateway, the method comprising:
   measuring, at the gateway, a network speed provided by a first network source to a user device executing an application,
      wherein the network speed includes a first data transfer rate;
   determining that the network speed is below a quality threshold while the user device executes the application;
   determining the application is active on the user device for a time threshold;
   in response to the network speed being below the quality threshold and the application being active for the time threshold, identifying a second network source to combine with the first network source to increase the network speed, by:
      selecting the second network source based on metadata associated with network usage of the application,
      detecting a device connected to the second network source is within a proximity of the gateway, and
      determining the second network source is authorized to be combined with the first network source based on an authentication trigger associated with the device within the proximity of the gateway;
   combining, at the gateway, the first network source with the second network source to provide the user device with a second data transfer rate;
   determining a usage threshold for the second network source based on a usage subscription associated with the second network source; and
   disconnecting the second network source from the gateway based on a usage amount of the second network source reaching the usage threshold.

2. The method of claim 1, further comprising:
   identifying the second network source based on the application executing on the user device.

3. The method of claim 1, further comprising:
   identifying the second network source based on the proximity of the device.

4. The method of claim 1, further comprising:
   receiving, from a user interface, a request for an increased network speed; and
   sending a notification to the user interface with instructions for a user to perform for the increased network speed.

5. The method of claim 1, wherein the second network source is identified by at least one machine-learning algorithm, wherein the at least one machine-learning algorithm is trained based on at least one dataset associated with a past identification of secondary network sources.

6. The method of claim 1, wherein the quality threshold is selected by a user for the application or is predetermined based on a network subscription package of the user.

7. A computing system comprising:
   one or more processors; and
   one or more memories storing instructions that, when executed by the one or more processors, cause the computing system to perform a process for selecting a secondary network source at a gateway, the process comprising:
      measuring, at the gateway, a network speed provided by a first network source to a user device executing an application,
         wherein the network speed includes a first data transfer rate;
      determining that the network speed is below a quality threshold while the user device executes the application;

determining the application is active on the user device for a time threshold;

in response to the network speed being below the quality threshold and the application being active for the time threshold, identifying a second network source to combine with the first network source to increase the network speed, by:

selecting the second network source based on metadata associated with network usage of the application, detecting a device connected to the second network source is within a proximity of the gateway, and determining the second network source is authorized to be combined with the first network source based on an authentication trigger associated with the device within the proximity of the gateway;

combining, at the gateway, the first network source with the second network source to provide the user device with a second data transfer rate;

determining a usage threshold for the second network source based on a usage subscription associated with the second network source; and disconnecting the second network source from the gateway based on a usage amount of the second network source reaching the usage threshold.

8. The computing system of claim 7, wherein the process further comprises:
identifying the second network source based on the application executing on the user device.

9. The computing system of claim 7, wherein the process further comprises:
identifying the second network source based on the proximity of the device.

10. The computing system of claim 7, wherein the process further comprises:
receiving, from a user interface, a request for an increased network speed; and
sending a notification to the user interface with instructions for a user to perform for the increased network speed.

11. The computing system of claim 7, wherein the second network source is identified by at least one machine-learning algorithm, wherein the at least one machine-learning algorithm is trained based on at least one dataset associated with a past identification of secondary network sources.

12. The computing system of claim 7, wherein the quality threshold is selected by a user for the application or is predetermined based on a network subscription package of the user.

13. A non-transitory computer-readable medium storing instructions that, when executed by a computing system, cause the computing system to perform operations for selecting a secondary network source at a gateway, the operations comprising:

measuring, at the gateway, a network speed provided by a first network source to a user device executing an application,
wherein the network speed includes a first data transfer rate;

determining that the network speed is below a quality threshold while the user device executes the application;

determining the application is active on the user device for a time threshold;

in response to the network speed being below the quality threshold and the application being active for the time threshold, identifying a second network source to combine with the first network source to increase the network speed, by:

selecting the second network source based on metadata associated with network usage of the application, detecting a device connected to the second network source is within a proximity of the gateway, and determining the second network source is authorized to be combined with the first network source based on an authentication trigger associated with the device within the proximity of the gateway; and combining, at the gateway, the first network source with the second network source to provide the user device with a second data transfer rate;

determining a usage threshold for the second network source based on a usage subscription associated with the second network source; and disconnecting the second network source from the gateway based on a usage amount of the second network source reaching the usage threshold.

14. The non-transitory computer-readable medium of claim 13, wherein the operations further comprise:
identifying the second network source based on the application executing on the user device.

15. The non-transitory computer-readable medium of claim 13, wherein the operations further comprise:
identifying the second network source based on the proximity of the device.

16. The non-transitory computer-readable medium of claim 13, wherein the operations further comprise:
receiving, from a user interface, a request for an increased network speed; and
sending a notification to the user interface with instructions for a user to perform for the increased network speed.

17. The non-transitory computer-readable medium of claim 13, wherein the second network source is identified by at least one machine-learning algorithm, wherein the at least one machine-learning algorithm is trained based on at least one dataset associated with a past identification of secondary network sources.

* * * * *